United States Patent [19]

Reese

[11] 3,866,972
[45] Feb. 18, 1975

[54] TRUCK BED COVER ASSEMBLY

[76] Inventor: Murray C. Reese, 3046 Golfcrest, Houston, Tex. 77017

[22] Filed: Feb. 28, 1973

[21] Appl. No.: 336,850

[52] U.S. Cl. .............................. 296/137 B, 296/100
[51] Int. Cl. .............................................. B60j 7/10
[58] Field of Search ......... 296/137 B, 100; 292/189; 217/60 R, 60 B; 248/351, 356

[56] References Cited
UNITED STATES PATENTS

| | | | |
|---|---|---|---|
| 854,193 | 5/1907 | Betts | 292/189 |
| 2,989,340 | 6/1961 | Penner | 296/100 |
| 3,420,570 | 1/1969 | Kunz | 296/100 |
| 3,489,456 | 1/1970 | Klanke | 296/100 |
| 3,514,152 | 9/1968 | Hermon | 296/137 B |
| 3,704,039 | 11/1972 | Dean | 296/137 B |

Primary Examiner—Robert J. Spar
Assistant Examiner—Donald W. Underwood

[57] ABSTRACT

A flush-fitting cover for a pick-up truck bed including a frame conforming to the walls of the truck bed with a U-shaped central frame member mounting a pair of cover panels for pivotal movement to a closed, locked position in sealed engagement with the truck bed and the frame.

8 Claims, 5 Drawing Figures

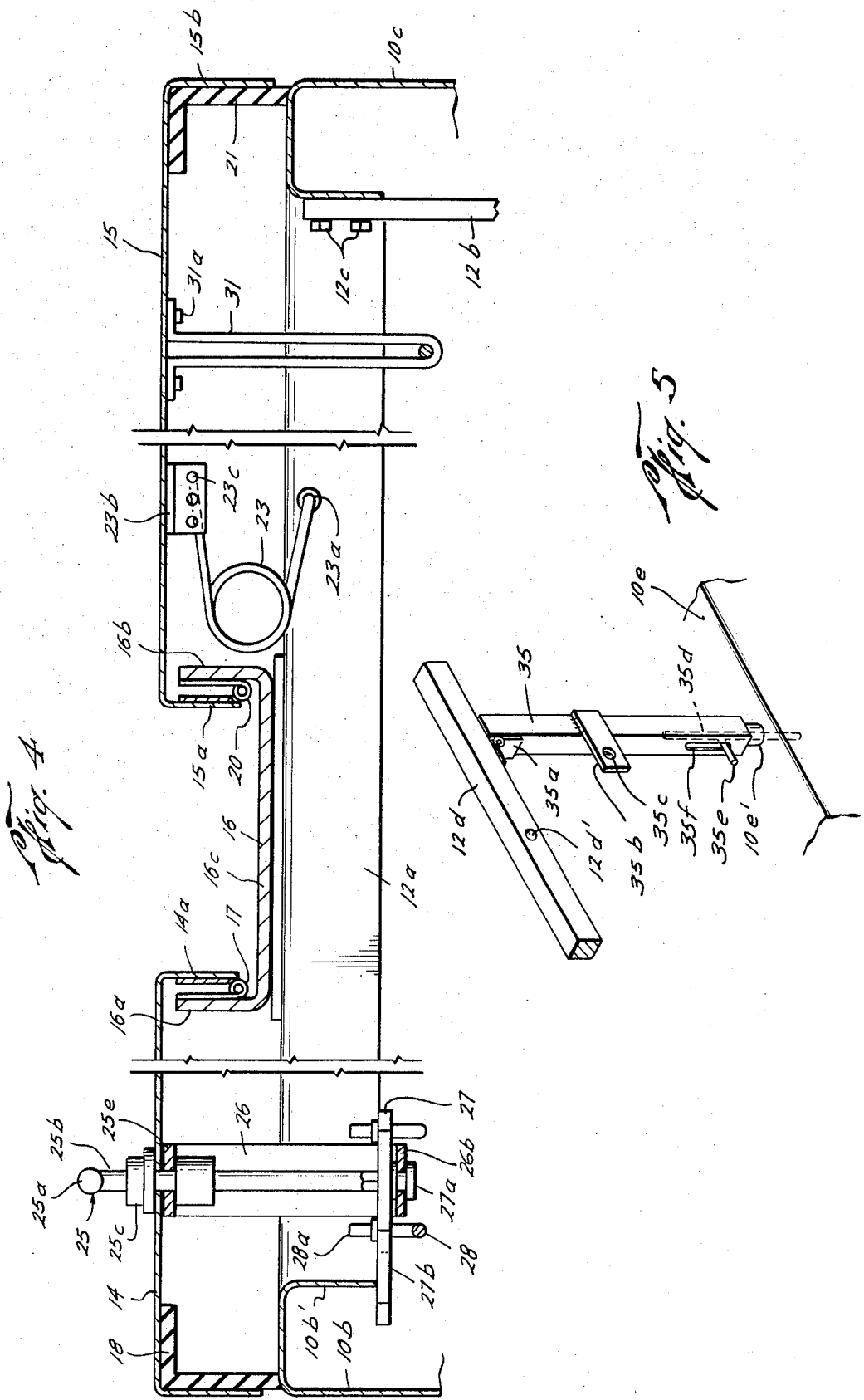

3,866,972

TRUCK BED COVER ASSEMBLY

BACKGROUND OF THE INVENTION

The field of this invention is a cover for the bed of a pick-up truck or the like.

Various types of covers have been suggested for covering the bed of a pick-up truck. For example, U.S. Pat. No. 3,514,152, issued to Hermon, discloses a pick-up truck bed cover wherein cover panels are mounted for pivotal movement upwardly about a central frame support for convenience in access to the bed. Another pick-up truck cover of this type is illustrated in U.S. Pat. No. 3,420,570, issued to Kunz.

SUMMARY OF THE INVENTION

It is an object of this invention to provide a new and improved, flush-fitting, substantially leak-proof cover for the bed of a pick-up truck or the like. The cover of the preferred embodiment of this invention includes a frame adapted for mounting inside the bed of the truck. The frame includes front and rear frame members connected by a central frame member upon which a pair of cover panels are pivotally mounted. The cover panels are movable between an open position and a closed position. In the closed position, the cover panels extend outwardly over the upstanding sidewalls of the truck bed and over the front and rear frame members to provide a flush fit. Further, a rubber gasket is mounted onto the panel covers and actually engages the front and rear frame members and the upstanding bed sidewalls in order to provide a substantially leak-proof seal therebetween.

Each panel cover is provided with a lock means which includes slidably mounted lock rods which, in the locked position, are positioned underneath the truck bed sidewalls and the front and rear frame members.

The central frame member is substantially U-shaped in cross section in order to provide strong support for the cover panels pivotally mounted thereon and further to prevent leakage into the truck bed itself.

BRIEF DESCRIPTION OF THE DRAWINGS

FIG. 4 is a cross-sectional view taken line 4 — 4 of FIG. 3 illustrating the rotatable lock assembly; and FIG. 5 is an isometric view of the pivotally mounted posts in a support position.

DESCRIPTION OF THE PREFERRED EMBODIMENT

Figure 1:
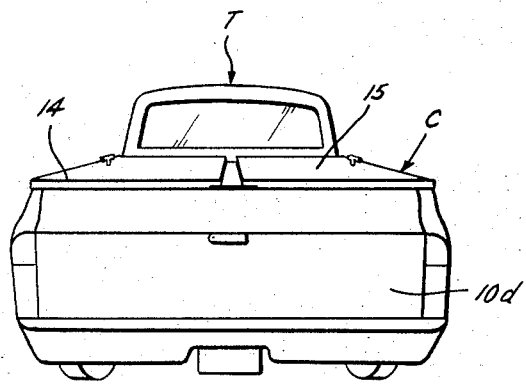
FIG. 1 is a rear, isometric view of the flush-fitting cover in the closed position on a pick-up truck bed.

Referring to the drawing, the letter T generally designates a pick-up truck having mounted therein the cover apparatus C of the preferred embodiment of this invention. The pick-up truck includes a truck bed generally designated as 10 having a front wall 10a, a left side wall 10b, a right side wall 10c and a rear tailgate 10d. The rear tailgate 10d is of conventional construction and is pivotally mounted onto truck bed the truck bed floor 10e by any suitable means (not shown) and is held in the open position by means of braces such as 11a and 11b in a well-known manner. The truck bed 10 is merely representative of any of various configurations of truck beds into which the cover apparatus C of the preferred embodiment of this invention may be mounted.

The cover apparatus C basically includes a frame generally designated as 12 having mounted thereon left cover panel 14 and right cover panel 15 which move between open and closed positions to expose and cover the truck bed 10. The frame includes a front, horizontal frame member 12a that includes end flanges such as 12b which are bolted to the upstanding side walls 10b and 10c by bolts 12c. A rear horizontal frame member 12d includes end flanges 12e which are bolted to the upstanding side walls 10b and 10c at the rear end of the truck bed 10 adjacent to the rear gate 10d.

A central, U-shaped frame member 16 is connected to the front frame member 12a and rear frame member 12d by any suitable means such as welding such that the central frame member 16 extends longitudinally of the truck bed 10 parallel to side walls 10b and 10c.

In the preferred embodiment of this invention, the central frame member 16 is a one-piece member which includes vertical portions 16a and 16b connected by a horizontal beam portion frame member portion 16c may be made of multiple pieces and welded or otherwise connected, if desired.

The left-hand cover panel 14 is basically rectangular in configuration and has a downwardly extending rim or edge extending about its entire periphery. For the purpose of explanation, the inside rim is designated as 14a and the outside rim is designated as 14b. The front rim is designated as 14c and the rear rim as 14d. The rim or downwardly extending edge 14a is positioned substantially adjacent to the vertical central frame portion 16a and is pivotally mounted therewith by a longitudinally extending hinge 17. A rubber seal or gasket 18 is glued or otherwise attached to the front rim 14c, the outside rim 14b and the back rim 14d in order to prevent leakage when the cover panel 14 is in the closed position of FIGS. 1, 3 and 4. Specifically, the portion of the rubber gasket 18 which is attached to the front rim portion 14c sealably engages the front horizontal frame member 12a when the cover panel 14 is in the closed position. Also, the rubber gasket portion 18 attached to the outside rim 14b sealably engages the truck bed side wall 10b and the rubber gasket portion attached to the back cover rim 14d engages the rear frame member 12d with the cover 14 in the closed position. Thus in the closed position, the rubber gasket 18 acts to prevent leakage of water or moisture into the covered truck bed area 10. It should be understood that the gasket 18 can be made of any other suitably resilient material such as a synthetic rubber or polymer product if desired.

Figure 2:
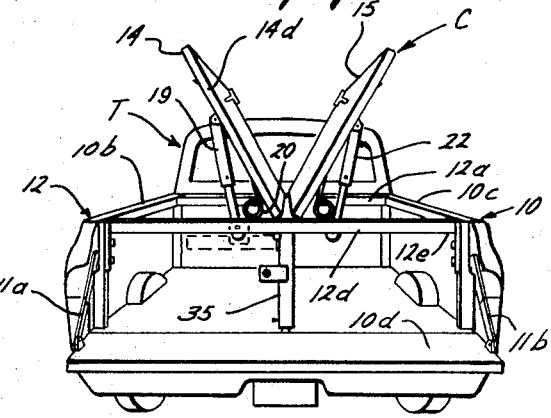
FIG. 2 is a rear, isometric view similar to FIG. 1 with the cover panels of the cover in the open position and the rear tailgate open.

The left-hand cover panel 14 is supported in the open position in the following manner. A telescoping brace 19 is pivotally attached to the rear cover rim 14d and to the rear frame member 12d and, a similar telescoping brace (not shown) is pivotally attached to the front rim 14c and to the front frame member 12a. The telescoping braces such as 19 include upper and lower slidably mounted portions which telescope into and out of each other in order to support the cover panel 14. In the preferred embodiment of this invention, the telescoping brace 19 actually locks in the open position for the cover panel 14 as illustrated in FIG. 2 and is unlocked by mechanical movement of a latch, (not shown) which allows the cover panel 14 to be closed. This type of telescoping brace 19 is well known in the art and any other suitable brace may be utilized. In addition, a coil spring 20 is pivotally mounted onto the rear frame member 12d and onto the rear cover panel rim 14d in order to further maintain the left-hand cover panel 14 in the open position and further to allow the cover panel 14 to be lifted from the closed position to the open position more easily. Another coil spring identical to the coil spring 20 is pivotally attached to the front cover panel rim 14c and to the front frame member 12a in order to provide additional support to the front portion of the cover panel 14 and to cooperate with the other coil spring member 19 in resiliently urging the left-hand cover panel 14 to the open position. The actual connection of the coil spring 20 will be described in connection with the right-hand cover panel 15. If desirable, the telescoping brace 19 may not include a releasable latch which holds the left-hand cover plate 14 in the open position such that the coil springs such as 20 mounted with the cover panel 14 will be designed of sufficient strength to hold the cover panel 14 in the open position.

The right-hand cover panel 15 is substantially identical to the left-hand cover panel 14. The right-hand cover panel 15 includes a downwardly extending peripheral rim or edge which is designated as 15a on the inside, 15b on the outside, 15c at the front thereof and 15d at the rear or back thereof. Of course, for the purposes of definition, the inside rims 14a and 15a are positioned substantially adjacent to each other and are pivotally attached to the U-shaped central frame member 16. The inside rim 15a is pivotally attached to the vertically extending central frame portion 16b by means of an elongated hinge 20 connected therebetween. The connection of the hinge 20 to the inside cover panel rim 15a and to the central frame portion 16b may be accomplished by means of screws, by welding or any other suitable means. A gasket 21 of rubber or other suitably resilient material is glued or otherwise attached to the inside of the front rim 15c, outside rim 15b and back rim 15d of the cover panel 15. The portion of the gasket attached with the front cover panel rim 15c resiliently engages the front frame member 12a when the cover panel 15 is in the closed position. Similarly, the portion of the gasket 21 attached to the outside cover panel rim 15b resiliently and sealably engages the upstanding bed side wall 10c and the portion of the gasket 21 attached with the rear cover panel rim 15d sealably engages the rear frame member 12d when the cover panel 15 is in the closed position.

Figure 3:
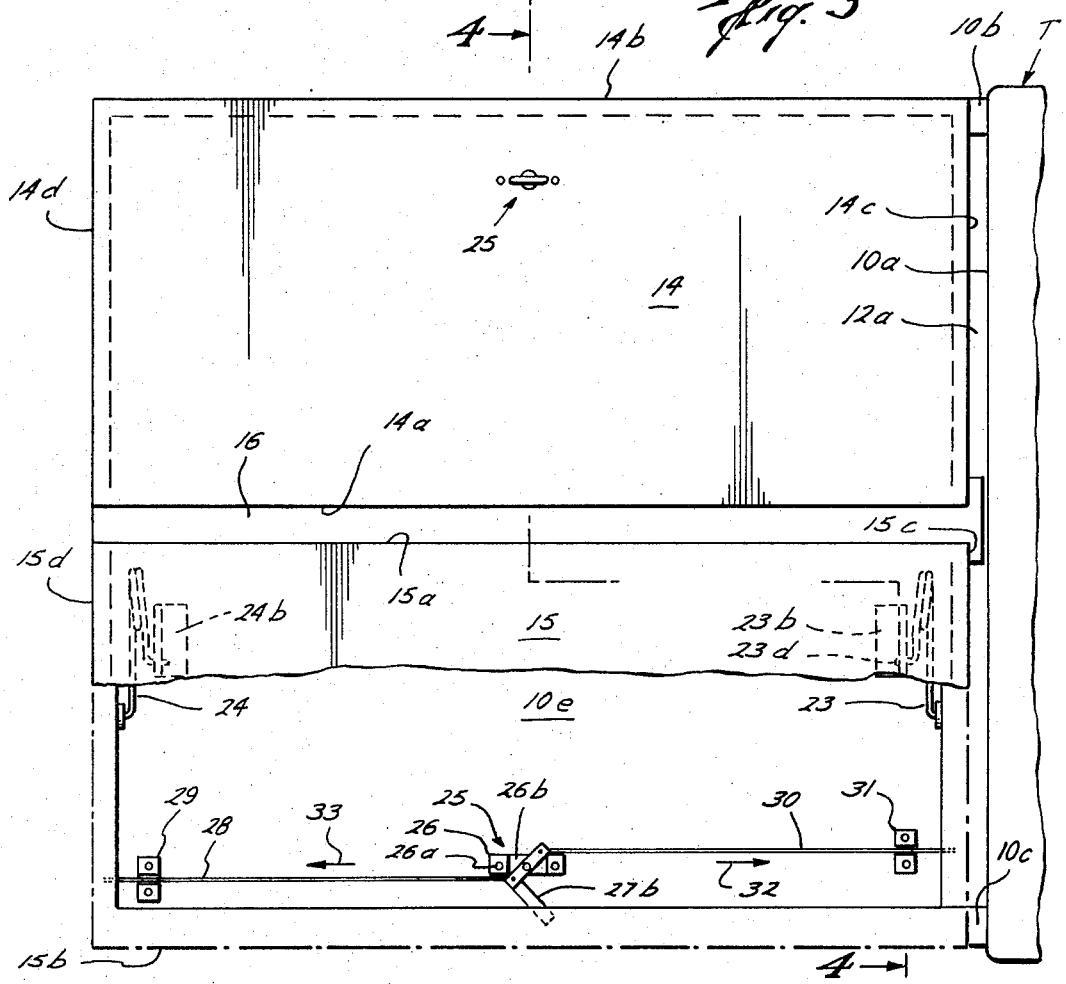
FIG. 3 is a top view of the cover panels in the closed position.

A telescoping brace 22 is pivotally mounted to rear cover panel rim 15d and to the rear frame member 12d in order to support the right-hand cover panel 15 in opening and closing. A similar telescoping brace (not shown) is mounted with the front cover rim portion 15c and the front frame member 12a. The telescoping braces 22 are similar in construction to the telescoping braces 19 and may include a latch member which supports the entire right-hand cover panel 15 in the open position of FIG. 2. Of course, when the latch (not shown) is then depressed in the well-known manner, the telescoping portions are allowed to telescope inwardly thereby allowing the right-hand cover panel 15 to be moved to the closed position. Referring to FIGS. 2, 3 and 4, coil springs 23 and 24 are pivotally connected between the frame 12 and the cover 15 in order to urge the right-hand cover panel to the open position thereby allowing a person to move it to the open position more easily. The coil spring 23 is pivotally connected to the front frame member 12a by any suitable means such as by extending a portion (not shown) of the coil spring 23 into an opening 23a in the front frame member 12. An L-shaped bracket 23b is tack-welded or otherwise attached to the underside of the right-hand cover panel 15 and includes three openings 23c to receive the end portion 23d of the coil spring 23. The providing of three such openings 23c in the bracket 23b allows the end 23d of the coil spring 23 to be mounted in any of the holes thereby varying the resistant spring force which urges the cover panel 15 to the open position. Similarly, the coil spring 24 is pivotally connected to the rear frame member 12d and to an L-shaped bracket 24b attached to the cover panel 15. The coil springs 23 and 24 act to urge the cover panel 15 to an open position and even maintain the panel 15 in the open position, if the latch mechanism on the telescoping braces such as 22 should either fail or not be utilized. Of course, it should be understood that the coil springs 20, 23 and 24 actually operate in a manner similar to a torsional spring but have herein been described as "coil" springs for the purpose of explanation only.

A lock means 25 is mounted with both the left-hand cover panel 14 and the right-hand cover panel 15 in order to lock the panels under the frame 12 and the truck bed side walls 10b and 10c. A portion of the right-hand cover panel 15 has been removed in FIG. 2 in order to expose the lock means 25 therefor for the purposes of explanation. Since of course, each lock means 25 is identical for each cover panel, identical numbers and letters shall be used to designate the same elements throughout the description. The lock means 25 includes a handle 25a which is mounted to a vertically extending shaft 25b. The vertically extending shaft 25b is mounted for rotation in each of the cover panels such as 14 and is sealed to prevent water leakage therethrough by any suitable means such as a resilient washer 25e. Bearings such as 25c are provided to mount the shaft portion 25b for rotation with respect to the cover panels such as 14. A U-shaped bracket 26 is mounted by means of bolts 26a or other suitable means to the underside of the cover panel such as 14 and includes a horizontal base portion 26b which is positioned below the lower end of the vertical shaft portion 25b. A locking disc 27 is mounted above the bracket base portion 26b and is connected to the shaft portion 25b for rotation therewith. This is accomplished by providing a pin 27a which extends through the locking disc 27 and the bracket base portion 26b into threaded connection with the vertical shaft 25b. In this manner, rotation of the handle 25a causes rotation of the locking disc 27. A side locking member 27b is mounted by a bolt or other suitable means with the locking disc 27. The side locking member 27b is positioned under the ledge 10b' of the side truck bed wall 10b whenever the entire locking means including the handle 25a is rotated to a locked position. A locking rod 28 includes a bent end portion 28a that is pivotally mounted with the locking disc 27. The locking rod 28 extends under the cover panels such as 14 or 15 almost to the back rim such as 15d thereof. A V-shaped bracket 29 is bolted or otherwise connected to the underside of the panel such as 15 to mount the locking rod 28 for slidable movement. Similarly, a front locking rod 30 is pivotally attached to the locking disc 27 and extends forward almost to the front panel rim such as 15c. A bracket 31 is mounted by bolts such as 31a or other suitable means to the underside of the panels in order to support the front locking rod for slidable movement. Thus, whenever the handle 25a is rotated to the lock position where the side locking element 27b is positioned under the truck bed side ledge 10b', the front locking rod 30 is moved forward in the direction of the arrow 32 underneath the front frame member 12a thereby locking the rubber gasket such as 21 attached to the front panel rim 15a in sealing engagement with the front frame member 12a. At the same time, the rear locking rod 28 is moved rearwardly in the direction of arrow 33 until a portion of the locking rod is positioned underneath the rear frame member 12d thereby locking the rear portion of a panel such as the panel 15 and the gasket 21 attached therewith against the rear frame member 15.

Thus, the lock means 25 for the left-hand cover panel 14 provides for the sealing engagement of the gasket 18 against the front frame member 12a, the side truck bed wall 10b and the rear frame member 12d with the lock means 25 in the locked position. Similarly, when the lock means 25 for the right-hand cover panel 15 is rotated to the locked position, the locking element 27b and the locking rods 30 and 28 hold and lock the rubber gasket 21 sealably against the front frame member 12a, the upstanding truck bed side wall 10c and the rear frame member 12d. In this manner, either one or both of the panels 14 and 15 can be sealably locked against the frame 12 and the truck bed side walls 10b or 10c as desired.

In order to provide additional support for the frame 12, a swinging post or support 35 is pivotally mounted onto the underside of the rear frame support 12d by any suitable means such as hinge 35a. The post 35 includes a bar 35b having an opening 35c therein which aligns with an opening 12d' in the rear frame member 12d when the post 35 is pivoted upwardly to a substantially horizontal position adjacent the frame member 12d. A pin (not shown) is then inserted through the aligned holes 35c and 12d' in order to hold the post 35 in the horizontal position. When the post 35 is pivoted to the horizontal position against the frame 12d, the rear portion of the truck bed 10 is free of any encumbrance to loading. After loading is finished or whenever it is desired to provide support for the rear frame member 12d and the cover panels 14 and 15 mounted and supported thereon, the post is swung to the substantially vertical position wherein the post is aligned over an opening 10e' in the truck bed floor 10e. A pin 35d is slidably mounted within the lower portion of the post 35 and is attached to a handle 35e which rides in a slot 35f in the post. The slidable mounting of the pin 35d allows the pin to be moved downwardly into the floor opening 10e' by exerting force against the handle portion 35e. With the pin moved downwardly to this latched position, the post 35 is held firmly in place and cannot be moved about even by an accidental blow against it.

The various members forming the elements of the frame 12 may be made of aluminum, steel or other suitable material as desired. The cover panels 14 and 15 may be made of fiberglass or aluminum or any other suitable, light-weight but strong material. One of the advantages of the frame design disclosed herein is that the entire cover apparatus C can be transferred from one pick-up truck or other vehicle to another as desired, as long as the overall dimensions of the truck bed are substantailly the same. The apparatus of this invention allows the bed such as the bed 10 of the pick-up truck T to be covered and sealed against moisture and/or water or other fluid thereby protecting the load inside. Yet, the load inside the truck bed 10 is readily accessible both from the top when the cover panels 14 and 15 are open and from the bottom when the rear gate 10d is swung downwardly and the post 35 is moved to its horizontal position and locked in place by the locking pin (not shown).

The foregoing disclosure and description of the invention are illustrative and explanatory thereof, and various changes in the size, shape, and materials as well as in the details of the illustrated construction may be made without departing from the spirit of the invention.

I claim:

1. A flush-fitted cover apparatus for the bed of a pick-up truck or the like wherein said bed in formed of an upstanding front wall, upstanding side walls, a floor and a pivotally mounted rear gate, comprising:

a frame assembly adapted for mounting inside said bed, said frame assembly including, front and rear frame members having mounted therewith a central frame member positioned between said upstanding bed side walls;

a pair of cover panels and hinge means mounting said cover panels onto said central frame member for movement between closed and open positions;

each of said cover panels extending outwardly over said upstanding bed side walls with said cover panels in said closed position;

a lock means mounted with each of said cover panels for locking said cover panels in said closed position, each of said lock means including lock rods that, in a locked position, lockingly engage under said front and rear frame members to lock said cover panels in said closed position; and said central frame member being U-shaped in cross-section and including a horizontal base and opposed, facing vertical sides extending upwardly from the base;

said hinge means including first and second hinge assemblies respectively mounted to the inward facing portions of said vertical sides and to said cover panels whereby said cover panels are independently mounted onto said central frame member and respectively extend over said vertical sides when in the closed position to substantially prevent water leakage between said cover panels.

2. The structure set forth in claim 1, including:

seal means mounted with said panel covers and sealably engaging said front and rear frame members and said upstanding bed side walls with said cover panels in said closed position.

3. The structure set forth in claim 1, wherein:

a post is pivotally mounted to the frame assembly for movement to a substantially vertical position to provide support.

4. The structure set forth in claim 3, including:

a latching member mounted with said post for slidable movement into engagement with said pick-up bed floor.

5. The structure set forth in claim 1, including:
telescoping supports pivotally mounted on each cover panel and onto said frame assembly for holding each of said cover panels in an open position.

6. The structure set forth in claim 1, including:
resilient spring members attached to each of said panel covers and to said frame.

7. The structure set forth in claim 1, wherein:
guides are mounted on each of said cover panels to support said lock rods.

8. The structure set forth in claim 1, wherein: each of said lock means further includes a rotatable lock assembly mounted with each panel cover and a pair of said lock rods attached to each of said rotatable lock assemblies whereby rotation of said lock assembly moves said lock rods in opposite directions to said locked position and, said lock means further including a locking element mounted with said rotatable lock assembly for rotation to a locked position under a ledge of said upstand truck bed side wall.

* * * * *